United States Patent

[11] 3,595,409

| [72] | Inventor | George Neville Bowman-Shaw<br>Toddington, England |
|---|---|---|
| [21] | Appl. No. | 819,249 |
| [22] | Filed | Apr. 25, 1969 |
| [45] | Patented | July 27, 1971 |
| [73] | Assignee | Lancer Boss Limited<br>Leighton Buzzard, Bedfordshire, England |
| [32] | Priority | May 9, 1968, Dec. 11, 1968 |
| [33] | | Great Britain |
| [31] | | 22079/68 and 58968/68 |

[54] SIDE LOADER VEHICLES
11 Claims, 12 Drawing Figs.

[52] U.S. Cl. .................................................. 214/75 R,
180/89, 214/670
[51] Int. Cl. .................................................. B60p 1/46
[50] Field of Search .......................................... 214/660,
670, 675, 671, 672, 673, 674; 180/89

[56] References Cited
UNITED STATES PATENTS

| 3,168,956 | 2/1965 | Jinks et al. .................... | 214/670 X |
| 3,435,969 | 4/1969 | McCartney et al. .......... | 180/89 |

*Primary Examiner*—Robert G. Sheridan
*Attorney*—Imirie and Smiley

ABSTRACT: A side loader vehicle comprising front and rear body portions respectively supported on front and rear road wheels and interconnected by a backbone along one side of the vehicle, a recess in the opposite side of the vehicle extending substantially to the backbone, a fork mast load-lifting assembly mounted for power-operated movement in the recess transversely of the vehicle, guide means for a driver's cab extending across one end of the vehicle, a driver's cab mounted to move with respect to the guide means transversely of the vehicle, and power-operated means drivingly coupled to the cab to move the cab along the guide means.

PATENTED JUL 27 1971

Inventor

GEORGE N. BOWMAN-SHAW

By *Imirie & Smiley*
Attorneys

Inventor
GEORGE N. BOWMAN-SHAW

By *Imrie & Smiley*
Attorneys

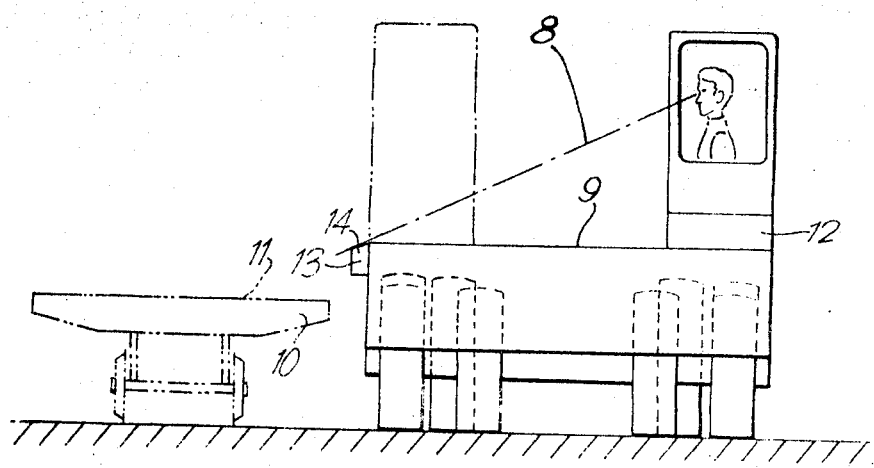
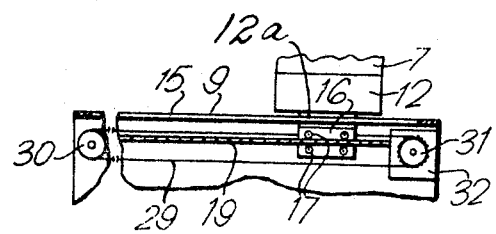
Inventor
GEORGE N. BOWMAN-SHAW

Inventor
GEORGE N. BOWMAN-SHAW

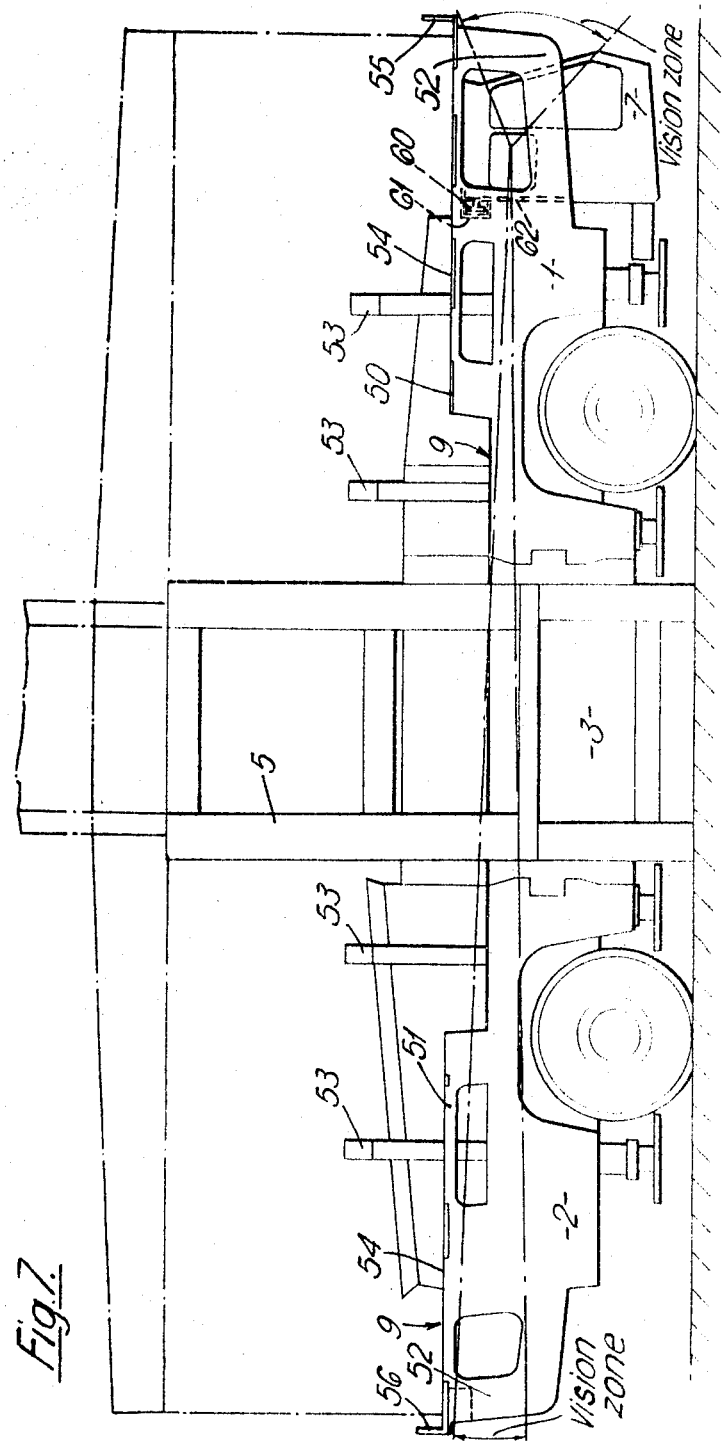

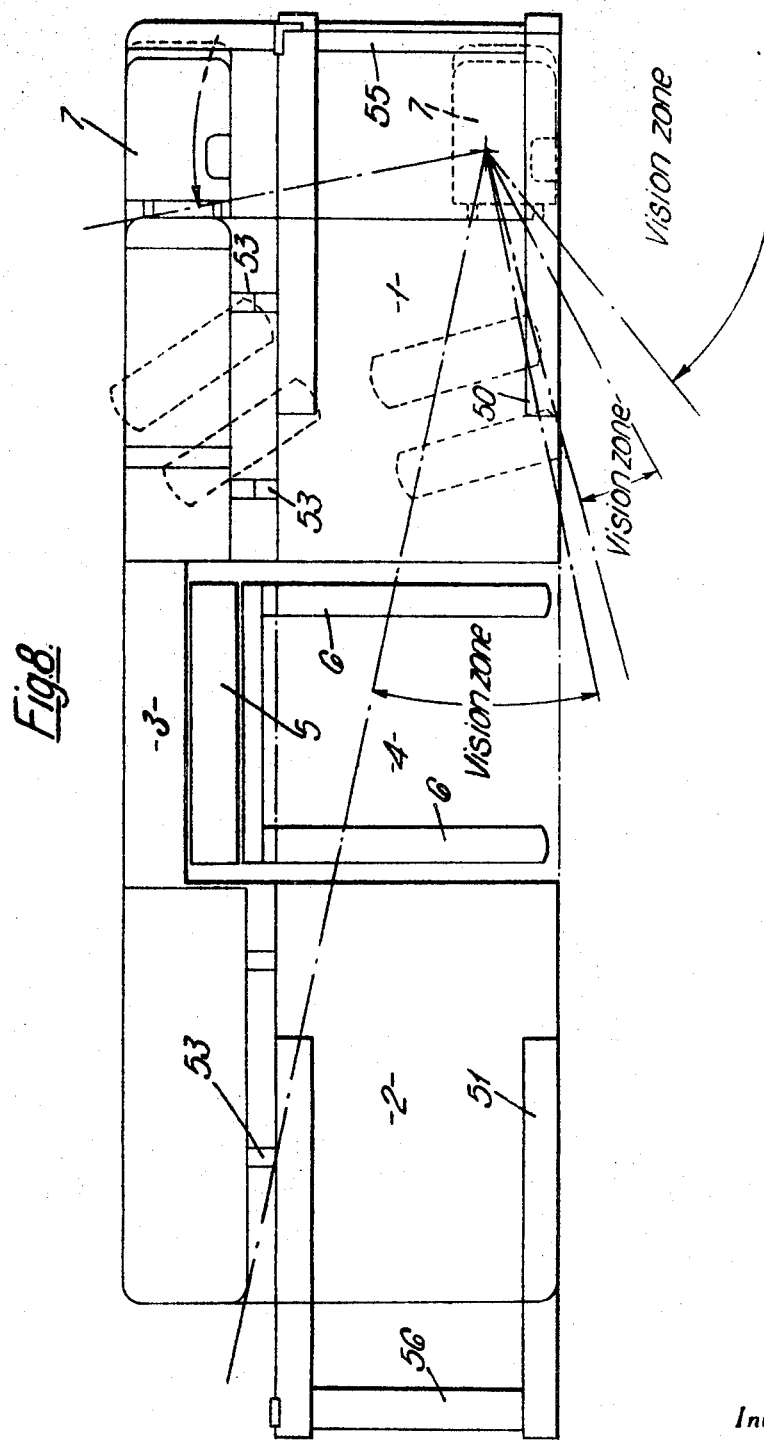

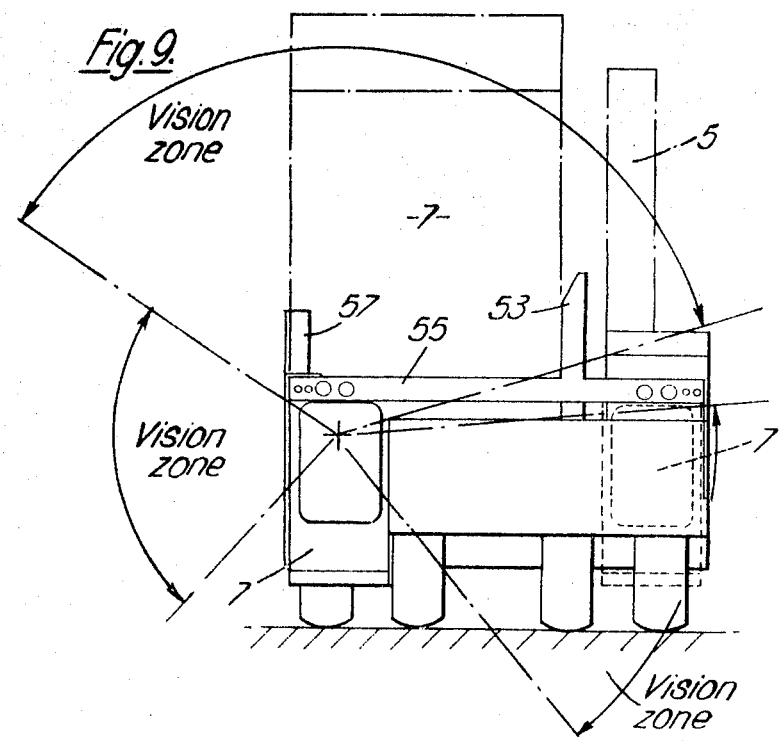
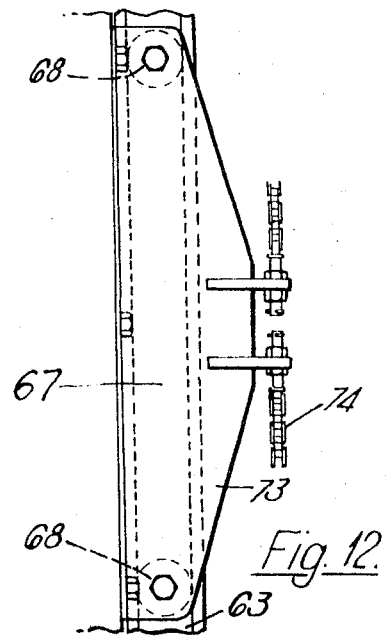
Inventor
GEORGE N. BOWMAN-SHAW

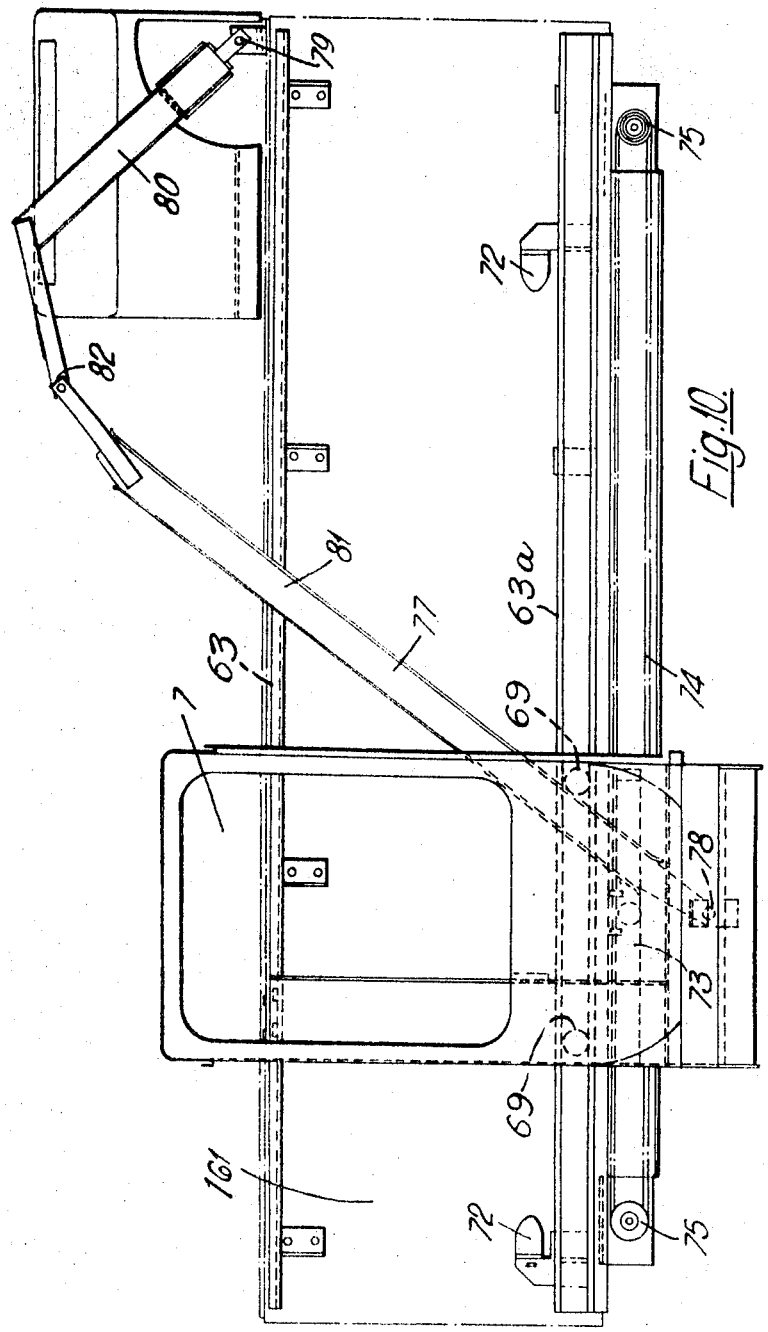

3,595,409

1

SIDE LOADER VEHICLES

BACKGROUND OF THE INVENTION

Field of the Invention

This invention relates to side loader vehicles of the kind having front and rear body portions, respectively supported on front and rear road wheels, which are interconnected by a backbone along one side of the vehicle, a recess being formed in one side of the vehicle between the two body portions in which a forklift mast on which rides a fork carriage is raised and lowered by power-operated means for raising a load can be traversed across the vehicle.

In use such vehicles are parked alongside a load to be lifted, such as a railway truck having a removable container body and the mast is moved across the recess in the vehicle to locate the forks transversely of the load whereby the forks can be operated to raise the load. The vehicle is driven and controlled in lifting operations from a driver's cab mounted on one side of the vehicle on one of the two body portions. Such constructions have the disadvantage that when the load to be lifted is close to the ground, the driver cannot see from his cab the part of the load engaged in the forks due to the shape of the side loader vehicle deck and this is accentuated when the deck is extended sideways as is sometimes the case.

The main object of the present invention is to provide a side loader vehicle in which the said disadvantage is minimized or substantially eliminated.

SUMMARY

According to the present invention a side loader vehicle of the kind set forth is provided with a driver's cab movably mounted on the vehicle body and power-operated means are provided for moving the driver's cab transversely of the body.

In one preferred construction the cab is mounted on a plinth part of which extends downwardly through a transverse slot in the vehicle deck, and a driving element is drivingly mounted beneath the deck and operatively connected to the plinth for traversing the same across the vehicle. The driving element is preferably power operated and controlled by the driver from the cab.

In another construction the cab is mounted on the body beneath the level of the load-carrying platform by means which permit its movement by the power-operated means transversely of the body in a path clear of the vehicle road wheels. The body is in one construction slung by members having slides or rollers thereon engaging along guides extending across the body. Preferably the cab is spaced below the plane of the load-carrying platform and a path of free vision is provided through the vehicle below the platform so that the driver in the cab can see right through to the rear of the vehicle and also under the load. When the cab is traversed to the side of the load from which the forks can be extended the driver from the cab can look out along the vehicle side and watch the engagement of the load by lifting means carried by the mast; moreover the driver has full forward vision which is advantageous when driving the vehicle forwards. A dashpot or damper device may be provided at one or both sides of the cab or body or chassis which cushions the movement of the cab at the extremities of its transverse movement.

BRIEF DESCRIPTION OF THE DRAWINGS

FIG. 3 is an end view of the vehicle in FIGS. 1 and 2 alongside a railway truck to be loaded;
FIGS. 4 to 6 show diagrammatically different cab traversing means;
FIG. 7 is a side view of another construction of side loader vehicle;
FIG. 8 is a plan view of the vehicle of FIG. 7;
FIG. 9 is a front view of the vehicle of FIG. 7;

FIG. 10 is a partial front view of a side loader having another cab mounting.

In the drawings the same references are used to designate the same or similar parts.

DESCRIPTION OF THE PREFERRED EMBODIMENTS

Figure 1:
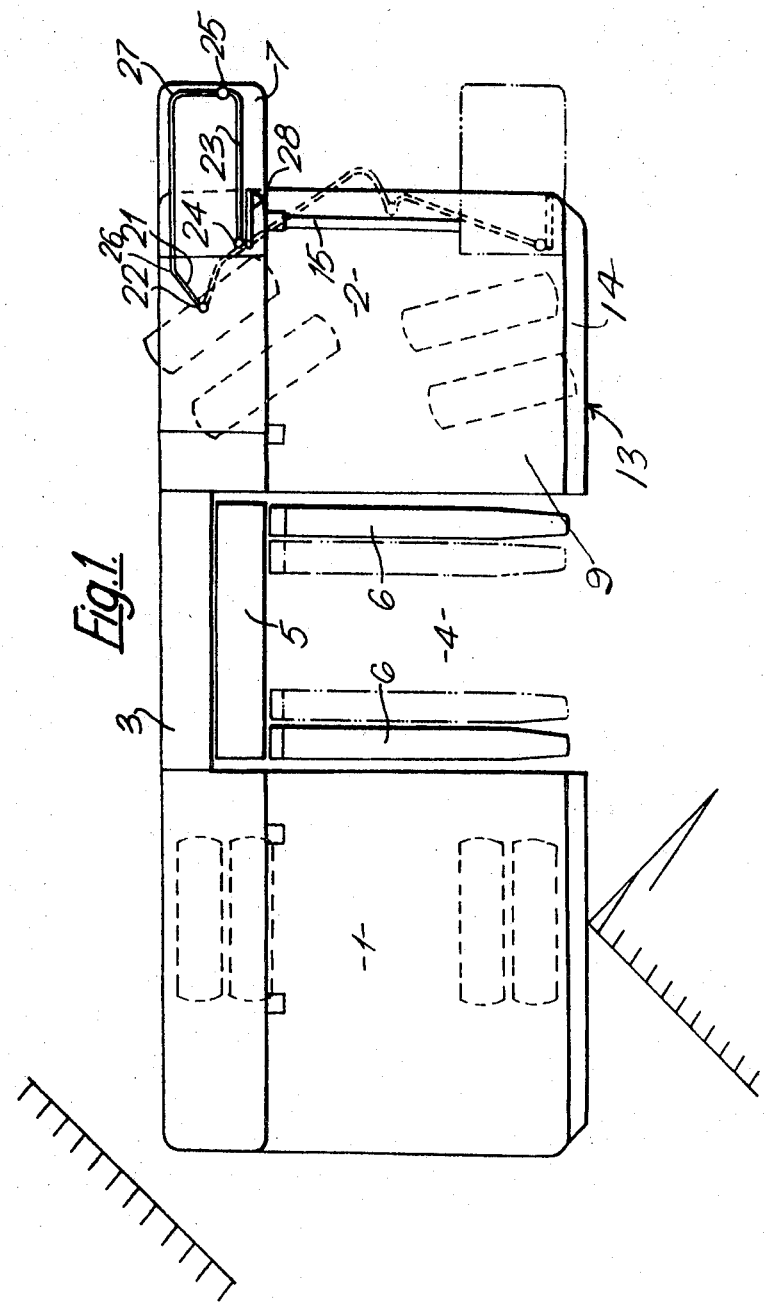
FIG. 1 is a plan view of a side loader vehicle.
Figure 2:
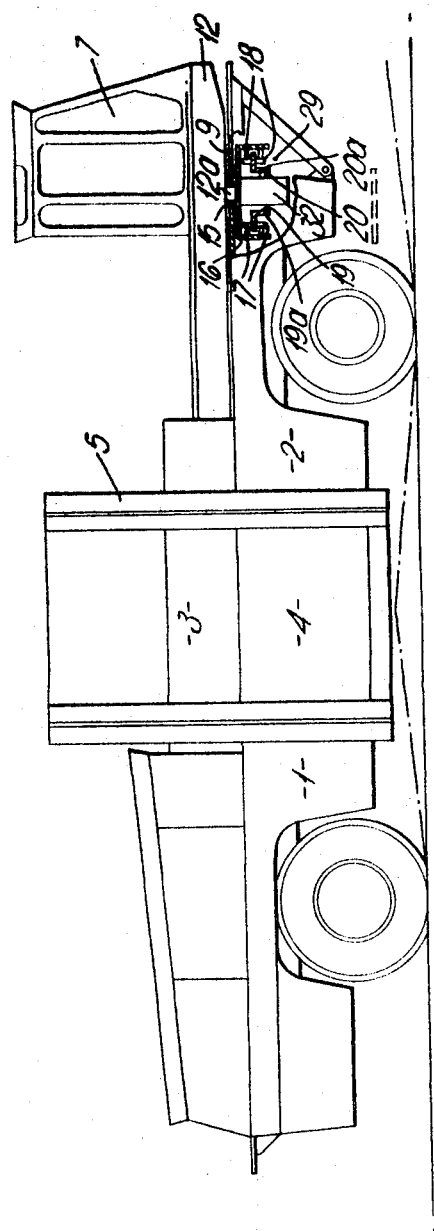
FIG. 2 is a side view of the vehicle in FIG. 1.

Referring to the drawings the plan of the side loader self-propelled truck in FIG. 1 shows the chassis as comprising a front body portion 1 and a rear body portion 2 longitudinally spaced from the front body portion and joined by a backbone 3 along one side thereof, leaving a transverse recess 4 in which the mast 5, carrying the raisable and lowerable forks 6, can be moved sideways of the vehicle to extend the forks sidewardly out of the vehicle to engage a load. The driver's cab 7 is conventionally located at one side of one of the body portions 1, 2 and as seen in FIG. 3 the driver's line of sight 8 (FIG. 3) from his cab is prevented by the opposite edge of the deck 9 from seeing the adjacent portion 10 of the load-bearing surface 11 (shown as the deck of a flatbed railcar on which a load is carried). The cab is mounted on a plinth 12 and this could be increased in height by a few inches but this does not fully overcome the problem. As seen in FIGS. 1 and 3 the deck 9 may be extended sideways as at 13 and its top edge 14 may then be bevelled off to assist the driver, but still the driver may require greater visibility with the cab in the position shown in FIGS. 1 to 3.

The cab plinth 12 has a part 12a (FIGS. 2 and 4) which extends downwardly through a track in the form of a slot 15 in the deck. Beneath the deck the plinth is secured to a frame 16 which is supported by rollers 17, 18 running in tracks 19, 20 fixed across the vehicle chassis, the rollers rolling on opposite sides of the tracks to prevent the plinth turning over. Additional side thrust rollers (not shown) may be provided on the frame 16 engaging a vertical face 19a, 20a on the tracks.

In the cab there are a number of control means such as levers which are connected by electric, hydraulic or pneumatic powerlines to the equipment they control. By operating the levers while seated in his cab, the driver exercises accurate control of all the working parts of the vehicle. However, when the cab is traversed, these powerlines can become entangled or foul the load or parts of the vehicle unless their movement is adequately controlled.

The powerlines are accordingly supported in a bundle by a pivoted linkage comprising a link 21 pivoted at 22 to the chassis and a second link 23 pivoted at 24 to the cab, the two links being pivotally interconnected at 25. The link 21 is bent at 26 to avoid it fouling a load on the deck and is bent at 27 so as not to foul a load or the driver's foot pedals including clutch, accelerator and brake. The linkage may be enclosed in a casing or may be in the form of a casing in which the powerlines are located and, maybe, clamped. The powerlines pass into the cab through an opening 28 which is preferably as shown an elongated slot.

For traversing the cab a chain 29 (FIG. 4) below the deck passes round an idler roller 30 journaled on the chassis and round a similarly journaled sprocket roller 31 which is power driven, the power being from, for example, a motor 32 on the vehicle chassis controlled from the cab. The rollers 17, 18 may be of suitable material such as rubber or steel.

Figure 5:
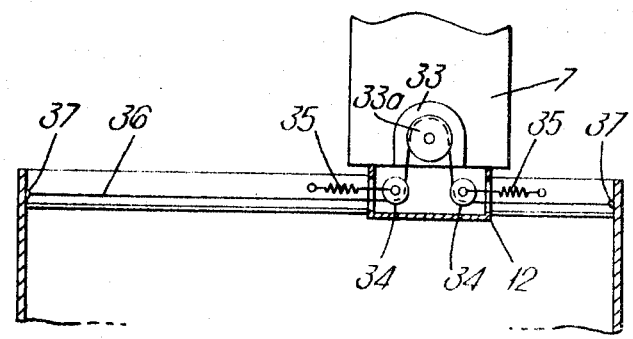

Referring to FIG. 5 this shows another traversing means, in this case a suitable motor 33, such as an electric or hydraulic reversing motor, on the shaft of which is a sprocket roller 33a and two idler rollers 34 urged as by springs 35 towards each other are mounted on the cab and/or plinth, and a chain 36 anchored by its ends 37 to the vehicle body passes round the rollers 33, 34, the springs 35 maintaining the chain in contact with the rollers. When the motor rotates the roller 33a, the chain having fixed ends, the cab is forced to move across the vehicle.

Figure 6:
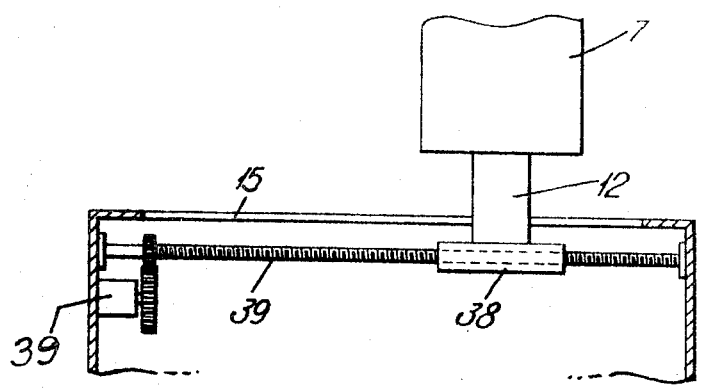

FIG. 6 shows a nut 38 on the cab plinth 12 having a threaded bore engaging on a threaded rotatable shaft 39 journaled by its ends to the body and rotated by a suitable motor 39 such as an electric or hydraulic reversing motor.

Referring to FIGS. 7, 8 and 9 these show a side loader vehicle having a front traversing cab.

The vehicle comprises the normal features of a side loader as already described herein and the decks 9 of the front and rear body portions 1, 2 are provided with upwardly directed extensions 50, 51 consisting of upward extensions of the outer sidewalls 52 on the loading side of the vehicle and parts built into the deck and to the uprights 53 on the other side of the vehicle. These extensions have horizontally directed portions 54 on which a load such as a railway container may be rested by the forks of the lifting apparatus. These raised load supports are interconnected either by transom members 55 and 56 or by upwardly extending members the latter being preferred since the member 56 tends to obscure the upper portion of the operator's vision forwardly and rearwardly of the vehicle. The cab 7 is disposed at the front of the vehicle, but it could be at the rear, or there could be one at the front and at the rear, and it is mounted so as to be traversed across the vehicle. In this modification, the cab is shown as being disposed beneath the deck 9. Any of the traversing mechanisms herein referred to with reference to FIGS. 4 to 6 or any other traversing power-operated means may be employed.

The cab is supported by rollers 60 running in channel 61 across the front of the vehicle, the rollers being supported on axles connected to the framework of the cab. The lead lines from the controls in the cab to the operating mechanism of the vehicle are carried in a casing or on pivoted brackets which can bend so that as the cab is traversed across the vehicle the lead lines will be flexed to follow the cab and will not become twisted.

In the back of the cab at the top there is an opening 62 so that the driver has full vision underneath the extension 50 through to the back of the truck and also he has full vision to the front. The dotted lines from the cab on the drawings show the angle of vision to the front and rear similarly in the other figures the angles of vision are shown. It will be appreciated that the driver from his seat when the cab is traversed right across the loading side has full vision down the side of the vehicle and can watch his load from underneath. He can also watch his load from underneath through the aperture 62 and when the cab is traversed to the other side of the vehicle he can see down that side of the vehicle also.

Figure 11:
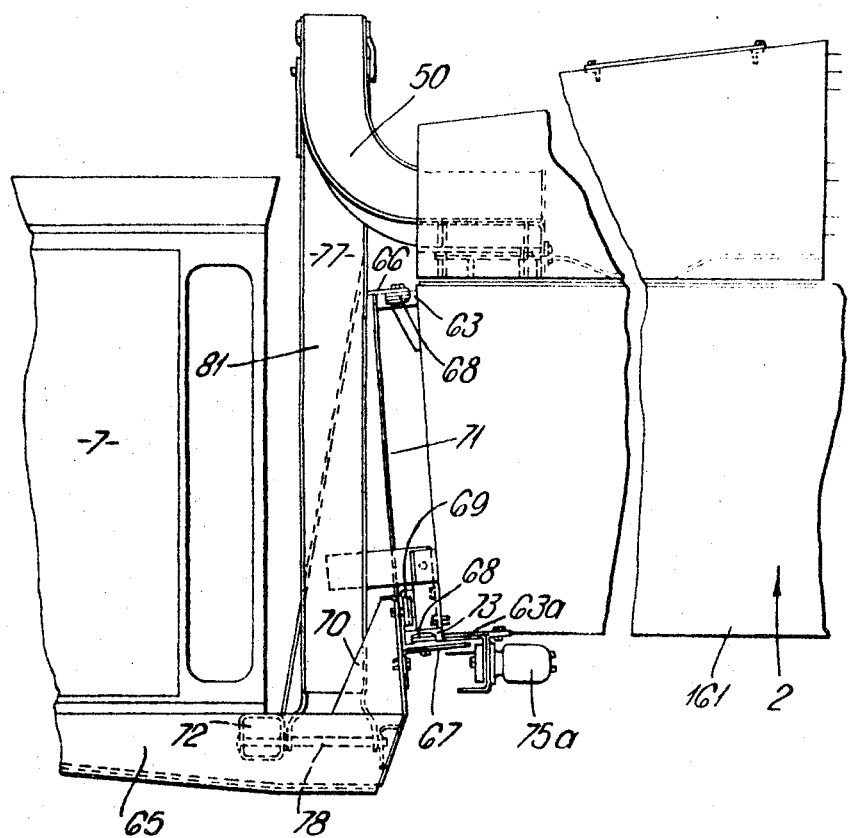
FIG. 11 is a partial side view of FIG. 10; and,
FIG. 12 is a plan view on an enlarged scale of the traversing means; for the cab in the construction of FIGS. 10 and 11.

Referring to FIGS. 10 to 12 these show the body part 161 (front or rear) of a side loader to the outer face of which are secured upper and lower rails 63, 63a. The cab 7 is mounted on a rigid framework 65 which at the side facing the body part 161 has supports 66, 67 secured to it on which are freely rotatably journaled guide wheels 68, rotating about a substantially vertical axis and similar wheels 69 rotating about a substantially horizontal axis. These wheels run on the rails to enable the cab to be moved freely across the body part.

The cab framework is strengthened by gussets 70 and a bracing plate 71. A resilient stop or buffer 72 is provided at each side of the vehicle to prevent jarring at the ends of the transverse movement of the cab.

The cab framework has an extension 73 of the support 67 to which are secured the ends of a chain 74 (FIG. 12) passing over side rollers 75 one of which is driven by a prime mover such as an electric motor 75a (FIG. 11) or other suitable device.

The cab is so mounted that when the driver looks out of the back thereof he can see along the deck 9 of the vehicle, and can see in other directions as explained herein with reference to FIGS. 7 to 9.

A cable case 77 is pivoted at 78 on the cab, and at 79 to the side part, the case having two parts 80, 81 hinged together at 82. The part 81 is curved rearwardly and carries the cables from the cab round to the cable connections to the control devices on the vehicle. Thus the cables of the controls from the driver's cab are protected by the casing and prevented from being fouled by the movement of the cab.

Preferably damping means such as springs or hydraulic shock absorbers 72 are inserted on each side of the vehicle so that the cab when it reaches the end of its traversing movement does not strike the side of the vehicle. The ends of the slots 15 (FIGS. 4 and 6) and the bumpers 72 limit movement of the cab 7 so that it will not extend beyond the sides of the vehicle.

I claim:

1. A self-propelled side loader vehicle comprising a chassis including front and rear body portions respectively supported on front and rear road wheels and interconnected by a backbone along one side of the chassis, said front and rear body portions being spaced longitudinally of the chassis to define a recess in the opposite side of the chassis extending substantially to the backbone, a forklift assembly mounted in the recess for movement vertically and transversely of the chassis, driver's cab guide means across one of said body portions at one end of the chassis, a driver's cab mounted to move across the chassis along said guide means between extreme positions in which the driver in the cab can see along one side of the vehicle or along the other side of the vehicle, and power-operated means drivingly coupled between the chassis and the cab for moving the cab transversely of the chassis, said power-operated means including control elements within said cab to enable control of cab movement from said cab and to activate cab movement independently of movement of said forklift assembly and the vehicle.

2. A side loader vehicle according to claim 1 wherein the cab is mounted on a plinth part of the chassis body portions and said plinth part extends downwardly to below the upper surface of said body portion, said power-operated means including a driving element mounted below said body portion upper surface and operatively connected to the plinth part, and a prime mover mounted on the chassis and operatively connected to the driving element for moving the cab through said driving element transversely of the chassis.

3. A side loader vehicle according to claim 1 wherein the cab is mounted substantially below the upper surfaces of said body portion on said guide means.

4. A side loader vehicle according to claim 3 wherein said guide means are disposed on said chassis so as to provide a path for said cab clear of the road wheels of said vehicle.

5. A side loader vehicle according to claim 1 wherein said cab is slung below the level of the upper surfaces of the body portion on antifriction means moveable along said guide means and said power-operated means are connected to said cab to traverse said cab along said guide means with respect to said chassis.

6. A side loader vehicle according to claim 1 wherein said cab is mounted below the level of the upper surface of said body portion and vision zones are provided from said cab along the sides of said vehicle, along the length of said chassis below the upper surfaces of such body portion and outwardly of the cab and vehicle.

7. A side loader vehicle according to claim 1 wherein said guide means comprises at least one guide track across one end of one of said body portion, said cab is provided with rollers in rolling engagement with said track, and said power-operated means comprises a prime mover and a flexible traction member anchored to said body portion and to said cab and is operatively engaged at least partly round a rotary element driven by said prime mover.

8. A side loader vehicle according to claim 1 wherein said guide means comprises at least one guide track across one end of said body portion, said cab being provided with rollers in rolling engagement with said track, and said power-operated means comprising a prime mover, a rotary threaded rod extending across said body portion substantially parallel to said track and driven by said prime mover, and a threaded element on said cab and threaded on said threaded rod.

9. A side loader vehicle according to claim 1 wherein the power-operated means is controlled from the cab by said control elements through flexible conduits, and an articulated conduit-supporting linkage connected between said cab and said body portion adjacent to said cab to change configuration during movement of said cab to maintain said conduits out of contact with said cab and body part and clear of a load supported by said body portion substantially within the area of the upper surfaces of said body portion.

10. A side loader vehicle according to claim 1 wherein said guide means permits movement of said cab between the extreme sides of said chassis, said guide means including means limiting movement of said cab to prevent extension of said cab beyond said chassis sides.

11. A side loader vehicle according to claim 1 wherein said power-operated means is independent of any power mechanism for operating said forklift assembly and for driving said vehicle.